US010614833B2

(12) United States Patent
Son

(10) Patent No.: US 10,614,833 B2
(45) Date of Patent: Apr. 7, 2020

(54) HEADSHELL AND TONEARM FOR MOUNTING CARTRIDGE OF AUDIO TURNTABLE AND AUDIO TURNTABLE COMPRISING SAME

(71) Applicant: Dong-Chan Son, Goyang-si (KR)

(72) Inventor: Dong-Chan Son, Goyang-si (KR)

(*) Notice: Subject to any disclaimer, the term of this patent is extended or adjusted under 35 U.S.C. 154(b) by 0 days.

(21) Appl. No.: 16/599,504

(22) Filed: Oct. 11, 2019

(65) Prior Publication Data

US 2020/0043520 A1 Feb. 6, 2020

Related U.S. Application Data

(63) Continuation-in-part of application No. 15/763,908, filed as application No. PCT/KR2016/010496 on Sep. 21, 2016, now abandoned.

(30) Foreign Application Priority Data

Sep. 30, 2015 (KR) .................. 10-2015-0137217

(51) Int. Cl.
*G11B 3/22* (2006.01)
*G11B 3/38* (2006.01)
(Continued)

(52) U.S. Cl.
CPC .................. *G11B 3/38* (2013.01); *G11B 3/06* (2013.01); *G11B 3/08* (2013.01); *G11B 3/10* (2013.01);
(Continued)

(58) Field of Classification Search
None
See application file for complete search history.

(56) References Cited

U.S. PATENT DOCUMENTS 4,029,322 A * 6/1977 Maeda .................. G11B 3/42
369/256
4,182,517 A 1/1980 Rosenberg
(Continued)

FOREIGN PATENT DOCUMENTS

GB 478711 A * 1/1938 ............... G11B 3/42
GB 678705 A * 9/1952 ............... H04R 1/16
(Continued)

OTHER PUBLICATIONS

English Specification of 10-0223630, pub. date: Oct. 15, 1999.
(Continued)

*Primary Examiner* — William J Klimowicz
(74) *Attorney, Agent, or Firm* — Antonio Ha & U.S. Patent, LLC

(57) ABSTRACT

According to an embodiment, a headshell connecting a cartridge and a tonearm of an audio turntable includes a first part connected with the cartridge, a second part connected with the tonearm, and a joint axially and pivotally coupling the first part and the second part. The second part includes a first tension adjusting assembly of a first ball, a first spring, and a first tension adjuster and a second tension adjusting assembly of a second ball, a second spring, and a second tension adjuster, wherein the first tension adjusting assembly and the second tension adjusting assembly are formed in the second part and in parallel with each other.

10 Claims, 7 Drawing Sheets

(51) Int. Cl.
  *G11B 3/10*     (2006.01)
  *G11B 3/06*     (2006.01)
  *G11B 3/34*     (2006.01)
  *G11B 3/46*     (2006.01)
  *G11B 3/20*     (2006.01)
  *G11B 3/08*     (2006.01)

(52) U.S. Cl.
  CPC ............... *G11B 3/20* (2013.01); *G11B 3/22* (2013.01); *G11B 3/34* (2013.01); *G11B 3/46* (2013.01)

(56) References Cited

U.S. PATENT DOCUMENTS

| | | | | |
|---|---|---|---|---|
| 4,203,606 | A | * | 5/1980 | Obata .................. G11B 3/31 369/255 |
| 4,325,132 | A | | 4/1982 | Kuehn |
| 2018/0286435 | A1 | * | 10/2018 | Son .................. G11B 3/38 |
| 2019/0130934 | A1 | * | 5/2019 | Cheon .................. G11B 3/06 |

FOREIGN PATENT DOCUMENTS

| | | |
|---|---|---|
| JP | 2739470 | 4/1998 |
| KR | 10-0223630 | 10/1999 |
| KR | 10-2008-0080015 | 9/2008 |

OTHER PUBLICATIONS

English Specification of 10-2008-0080015, pub. date: Sep. 2, 2008.
English Abstract of 2739470, pub. date: Apr. 15, 1998.

* cited by examiner

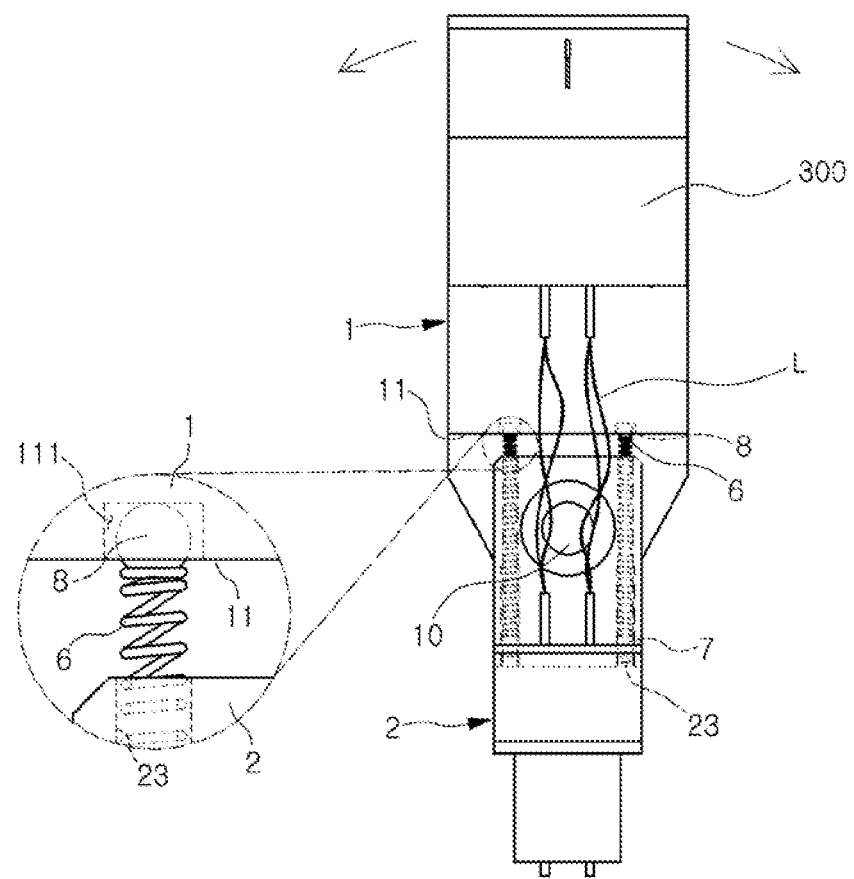

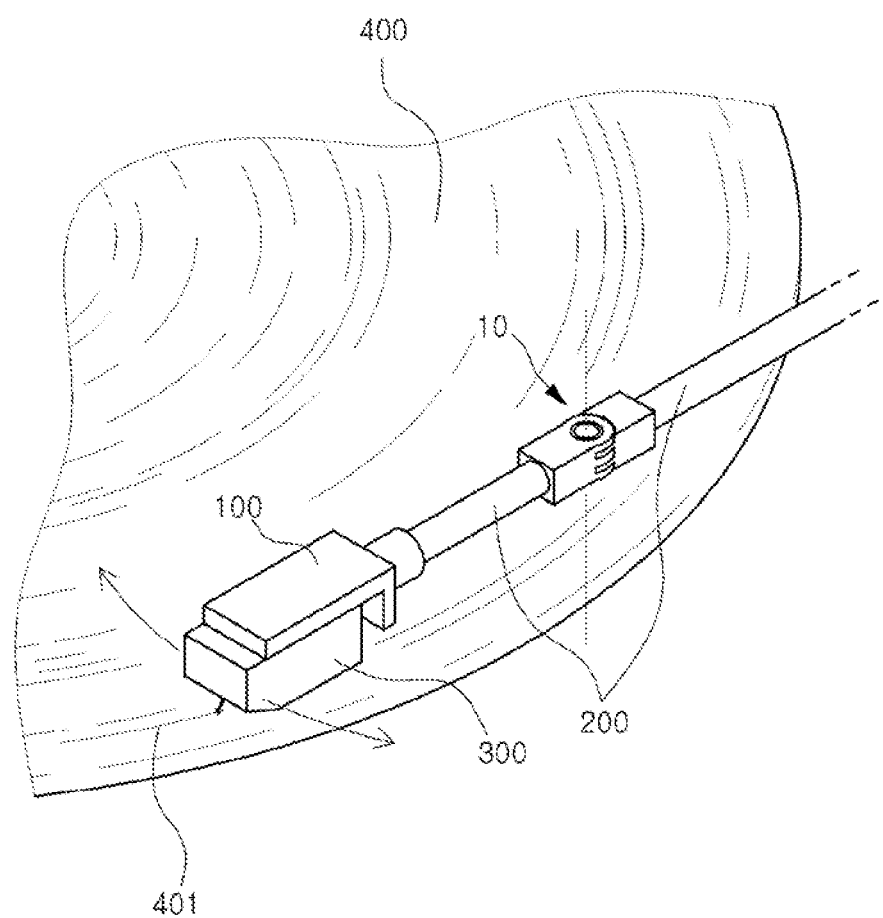

HEADSHELL AND TONEARM FOR MOUNTING CARTRIDGE OF AUDIO TURNTABLE AND AUDIO TURNTABLE COMPRISING SAME

CROSS-REFERENCE TO RELATED APPLICATIONS

This patent application is a continuation-in-part application of U.S. patent application Ser. No. 15/763,908, filed on Mar. 28, 2018, which is a national-stage application of International Patent Application No. PCT/KR2016/010496, filed on Sep. 21, 2016, which claims priority under 35 U.S.C. § 119 to Korean Patent Application No. 10-2015-0137217, filed on Sep. 30, 2015, in the Korean Intellectual Property Office, the disclosures of which are incorporated by reference herein in their entireties.

TECHNICAL FIELD

The present invention relates to headshells and tonearms, parts of audio turntables, and particularly, to headshells and tonearms of swing arm audio turntables, which enable accurate reading of the groove of an LP record.

DISCUSSION OF RELATED ART

FIG. 1 is a view briefly illustrating a swing arm audio turntable in wide use. A stylus of a cartridge 20 is guided along spiral grooves 31 and 32 formed in a record 30, reading out the sound source while gradually moving to the center of the record 30. At this time, a tonearm 10 swings around the shaft connected to the turntable.

In the figure, dashed lines denote the trajectory K along which the stylus of the cartridge 20 travels as the tonearm 10 swings. The trajectory K has an overhang (the interval between the spindle S and the stylus) from the center of the turntable. The overhang is intended to reduce an error angle that occurs as the stylus moves inwards.

As the stylus of the cartridge 20 moves along the arched trajectory K formed by the tonearm 10 swinging, the stylus of the cartridge 20 may fail to be aligned with the direction of the tangent to all the grooves which are substantially circular.

Specifically, FIG. 1 illustrates the case where the turntable has been set such that the direction D1 of the stylus of the cartridge 20—the front-rear direction of the cartridge—is consistent with the direction of the tangent V1 to a first groove 31 which is larger in radius.

Where the tonearm 10 swings over time so that the stylus of the cartridge 20 moves up to a second groove 32 having a smaller radius than the first groove 31, an angle A arises between the direction of the tangent V2 to the second groove 32 and the direction D2 in which the cartridge 20 is placed, meaning that the stylus is slanted from the direction of the tangent to the groove 32, resulting in the stylus's failure to precisely reading out information from the grooves and hence a disparity in played sound between the grooves 31 and 32 despite the fact that same sound source has been recorded in the grooves.

Furthermore, the stylus contacting the groove while being inclined at the angle may cause one-side wear to the stylus, damage to the LP record, and significant noises.

SUMMARY

The present invention aims to address the above problems of existing audio turntables. Specifically, the present invention is intended to allow the cartridge stylus to track along the direction of the tangent to the groove which is formed in the record and is nearly circular.

Other objectives of the present invention will be apparent to one of ordinary skill in the art from the detailed description set forth below.

To achieve the above objectives, according to an embodiment of the present invention, there is proposed a headshell for mounting a cartridge of an audio turntable, wherein the headshell connects the cartridge with a tonearm and has a joint part to enable the coupled cartridge to rotate on a horizontal plane.

As an example, the joint part may include a first part coupled with the cartridge and a second part connected with the tonearm, wherein the first part and the second part may be jointed together via a bearing.

As per another embodiment, the joint part may include a first part and a second part jointed together, the first part coupled with the cartridge and the second part connected with the tonearm. The second part may include springs provided at a left side and a right side of the joint part and elastically pushing the first part against the second part and tension adjustors each adjusting tension of a respective one of the springs.

According to another embodiment, there is proposed a tonearm provided in an audio turntable, able to swing, and having a cartridge mounted on a front tip thereof, wherein the tonearm includes a joint part to enable a cartridge coupled to rotate on a horizontal plane.

According to an embodiment, a headshell connecting a cartridge and a tonearm of an audio turntable includes a first part connected with the cartridge, a second part connected with the tonearm, and a joint axially and pivotally coupling the first part and the second part. The second part includes a first tension adjusting assembly and a second tension adjusting assembly. The first tension adjusting assembly may include a first ball, a first spring, and a first tension adjuster. The second tension adjusting assembly may include a second ball, a second spring, and a second tension adjuster. The first tension adjusting assembly and the second tension adjusting assembly are formed in the second part and in parallel with each other.

The first tensioning assembly and the second tensioning assembly may be arranged symmetrically with respect to a longitudinal central axis as viewed from above the headshell.

The first part of the headshell may include a first hole and a second hole in a surface facing the second part, and the first ball and the second ball may be inserted into the first hole and the second hole, respectively, of the first part.

The first ball, the first spring, and the first tension adjuster may be assembled in the order thereof, and the second ball, the second spring, and the second tension adjuster may be assembled in the order thereof.

The first tension adjuster or the second tension adjuster may be at least one of a fastening screw or a headless bolt.

The joint may include a cylindrical joint shaft, a first bearing, a second bearing, a spring washer, and a bolt. The bolt may be screwed through the spring washer, the second bearing, and the first bearing into the cylindrical joint shaft.

The first part of the headshell may include a front tip and a rear tip stepped from the first tip. The second part of the headshell may include a front tip block and a rear tip block integrally formed with each other. The rear tip block may include a first through-hole and a second through-hole. The first tension adjusting assembly and the second tension adjusting assembly may be inserted into the first through-hole and the second through-hole, respectively.

The first part of the headshell may swing or pivot on the second part of the headshell to be misaligned with the second part and be aligned back with the second part by elasticity of the first spring and the second spring.

An embodiment of the present invention may deliver an enhanced sound quality upon playing records. In particular, the present invention may diminish a disparity in sound quality when the record is played along its outer and inner grooves, along with one-sided wear of the stylus and damage to the record and noise.

Other effects of the present invention may be apparent to one of ordinary skill in the art from the detailed description set forth below or practicing the present invention.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein:

FIG. 9 is a bottom view of the embodiment of FIG. 8; and

FIG. 10 is a perspective view briefly illustrating a state of use of a tonearm according to an embodiment of the present invention.

DETAILED DESCRIPTION OF EXEMPLARY EMBODIMENTS

Figure 1:
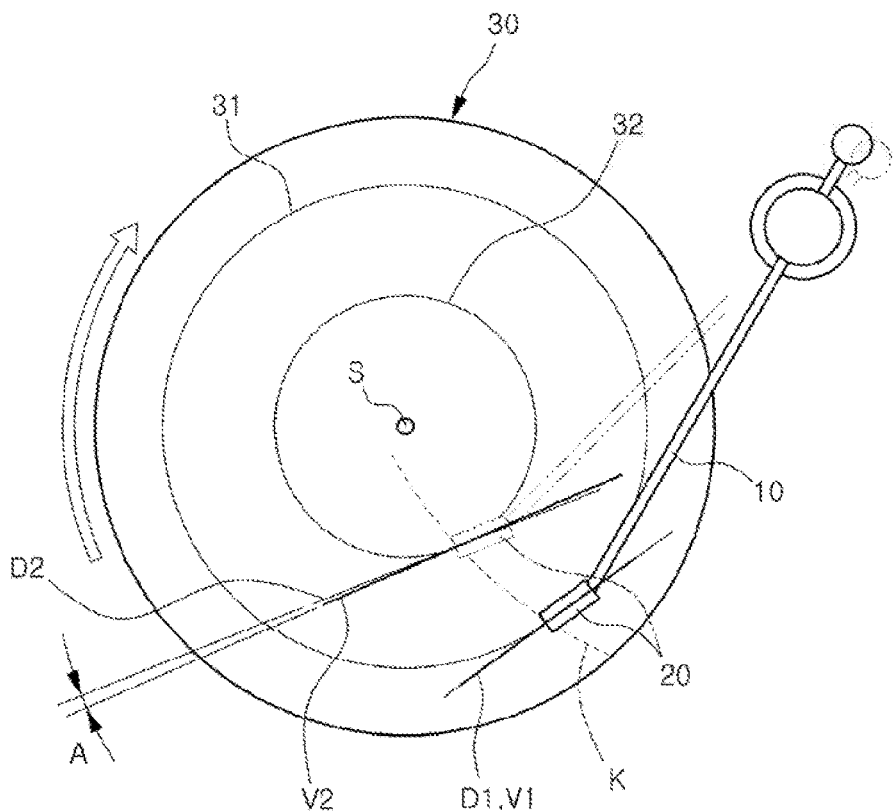
FIG. 1 is a view briefly illustrating an audio turntable according to the prior art.
Figure 2:
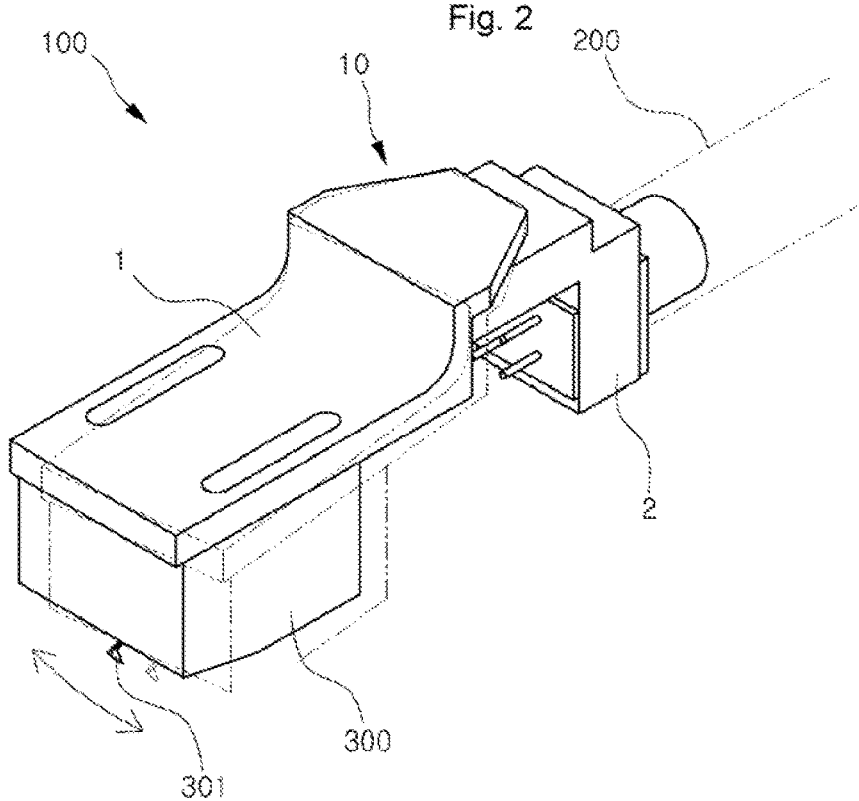
FIG. 2 is a perspective view illustrating a headshell according to an embodiment of the present invention.

Hereinafter, according to the present invention, configurations, functions, and operations of a cartridge-mountable headshell and tonearm and an audio turntable including the headshell and the tonearm are described with reference to the accompanying drawings. The same reference numbers refer to the same or similar elements throughout the drawings and the specification.

The terms "first" and "second" as used herein are used, for convenience, to distinguish between components that have the same or similar meaning. That is, some component may arbitrarily be termed a "first component" or "second component."

The accompanying drawings show embodiments of the present invention, but the technical spirit of the present invention should not be intended as limited thereby. The whole or part shown in the drawings does not limit the invention defined in the claims if it can be construed from a point of view of one of ordinary skill in the art that its shape, form, or order is inevitable in practicing the present invention.

FIGS. 2 to 7 relate to a cartridge-mountable headshell of an audio turntable according to the present invention.

A headshell 100 is a member connecting a cartridge 300 with a tonearm. The cartridge 300 attached to the headshell 100 may be gradually relocated by adjusting the bolt according to the known art. Although not specifically shown, the headshell according to the present invention may take a configuration or shape for changing the location where the cartridge is affixed according to the conventional art.

The headshell 100 includes a joint part 10 that enable the cartridge 300 to rotate on the horizontal plane with the tonearm fastened.

To that end, specifically, the headshell 100 includes a first part 1 to which the cartridge 300 is fastened and a second part 2 coupled to the tonearm 200. The first part 1 and the second part 2 are jointed together, forming the joint part 10.

Figure 4:
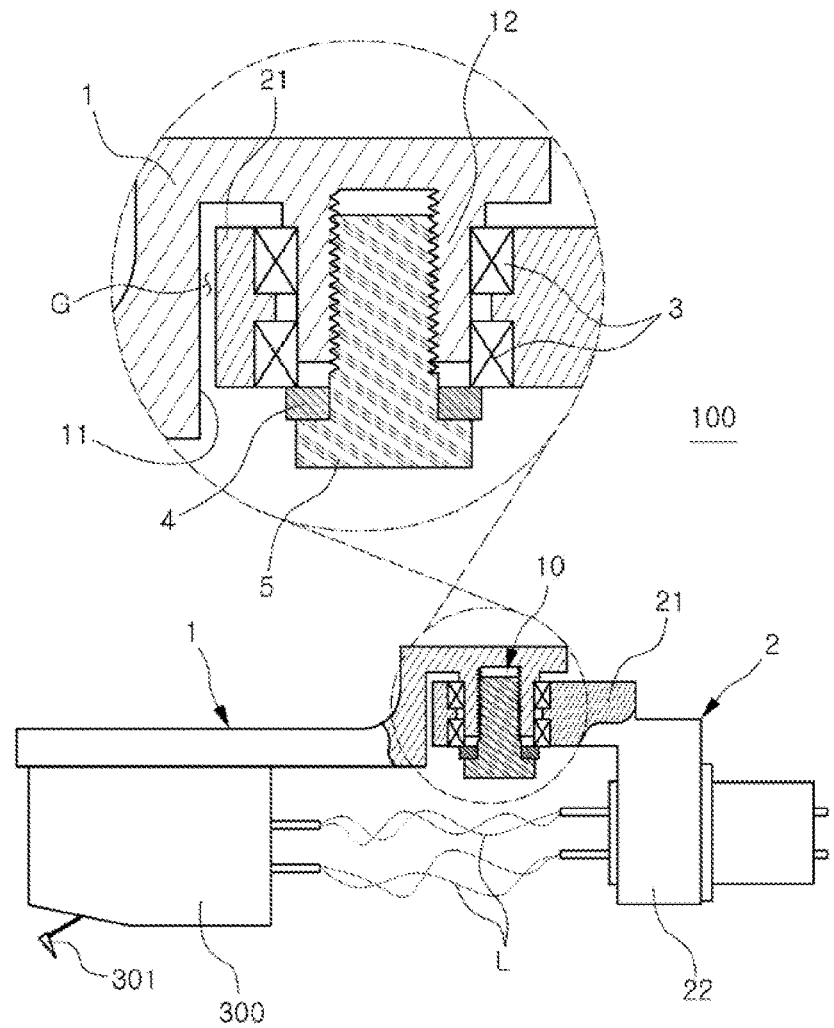
FIG. 4 is a side cross-sectional view of the embodiment of FIG. 2.
Figure 5:
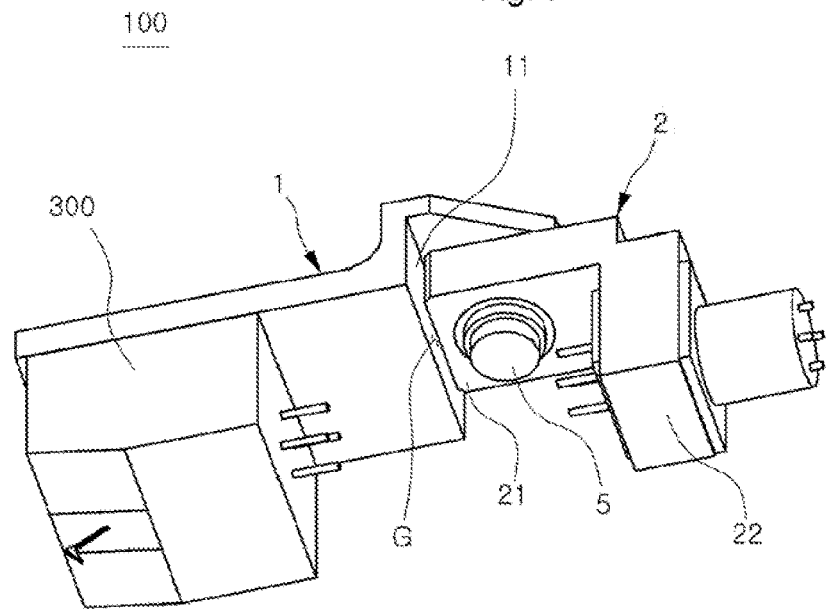
FIG. 5 is a bottom perspective view of the embodiment of FIG. 2.

The cartridge 300 is detachably affixed onto the bottom of a front tip of the first part 1, and a rear tip of the first part 1 is stepped from the front tip. Referring to FIGS. 4 and 5, a vertical wall surface 11 is formed rearwards due to a difference in height between the front tip and the rear tip.

Figure 3:
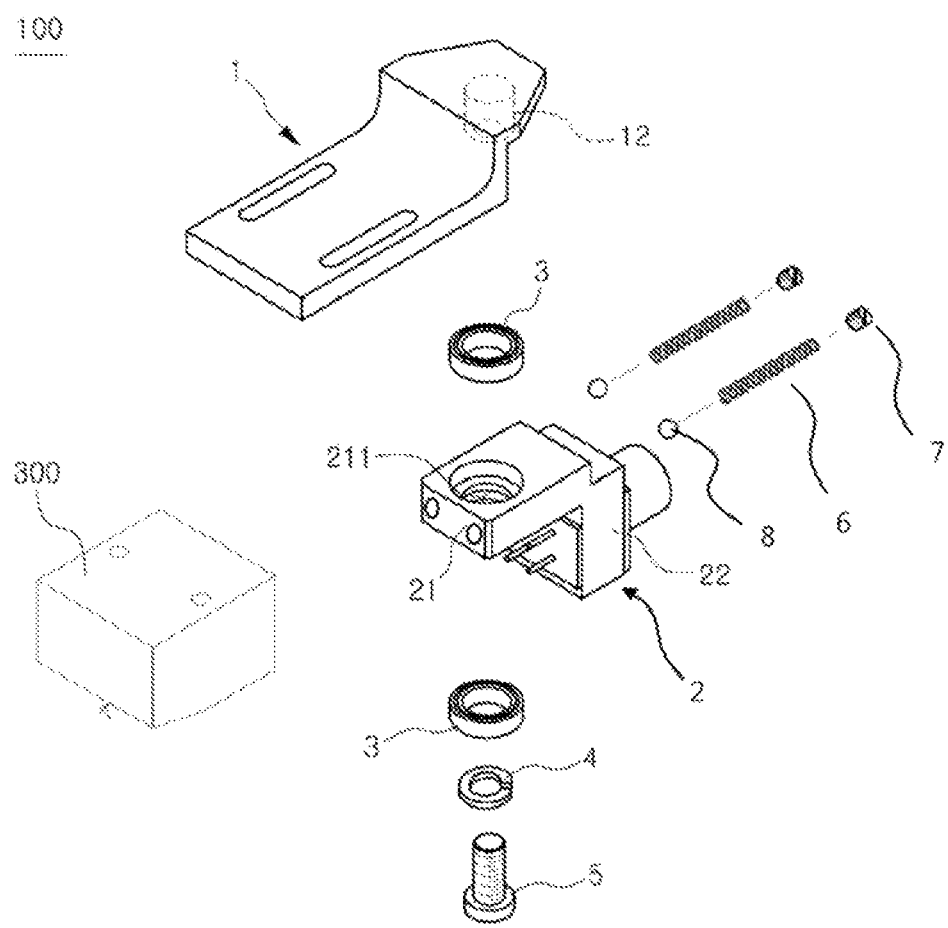
FIG. 3 is an exploded perspective view illustrating the embodiment of FIG. 2.

Referring to FIGS. 3 and 4, the rear tip of the first part 1 has a joint shaft 12 which is shaped as a cylinder extends downwards. A screw hole is formed in the joint shaft 12, allowing a bolt 5 to be fitted therein.

Referring to FIG. 3, the second part 2 includes a front tip block 21 and a rear tip block 22. A mounting hole 211 is formed in the front tip block 21 to axially couple with the first part 1. Balls 8, springs 6, and fastening screws 7 may be assembled in the front tip block 21 to allow the front tip block 21 to contact, and elastically rotate on, the front tip of the first part 1. The fastening screws 7 are provided to firmly hold or fasten the balls 8 and the springs 6. The rear tip block 22 may continuously extends from the front tip block 21 and may connect with the tonearm 200. The front tip block 21 and the rear tip block 22 may be integrally formed with each other. A bearing 3 is mounted in each of the top and bottom of the mounting hole 211. For example, there may be provided two bearings 3 including an upper bearing 3 and a lower bearing 3 as shown in FIG. 3. The upper bearing 3 and the lower bearing 3, respectively, may be inserted to the top and bottom of the mounting hole 211. The joint shaft 12 is fitted into the mounting hole 211, with the bearings 3 mounted. The bolt 5 is fitted into the screw hole of the joint shaft 12 with a spring washer 4 placed, thereby completing the assembly of the joint part 10.

Referring to FIG. 4, at the side view of the headshell 100 assembled, the joint part 10 is formed in an upper portion of the middle of the assembled headshell 100. Thus, a space may be secured for connecting headshell leads L to the rear tip block 22 of the second part 2 and the cartridge 300. Output terminals of the cartridge 300 and input terminals of the rear tip block 22 are connected to the headshell leads L which are bendable. Given the rotation of the cartridge 300, the headshell leads L are loosely connected to the terminals.

As such, as the first part 1 and the second part 2 are axially coupled to each other, the first part 1 provided with the cartridge 300 may freely turn on the horizontal plane.

Although not shown, various changes may be made to the joint part. The first part and the second part may adopt various pivot connections or magnetic joints to allow the first part to rotate about the second part on the horizontal plane.

Further, the angle at which the first part 1 turns about the second part 2 may be limited to a range. At this time, such configuration is possible as to limit the angle of rotation of the first part 1 while bringing the second part 2 in contact with the first part 1.

In the embodiment of FIGS. 1 to 7, the range of angles at which the first part 1 is rotatable may be limited by the contact between the vertical wall surface 11 formed in the middle of the first part 1 and the front tip of the front tip block 21 of the second part 2.

Figure 6:
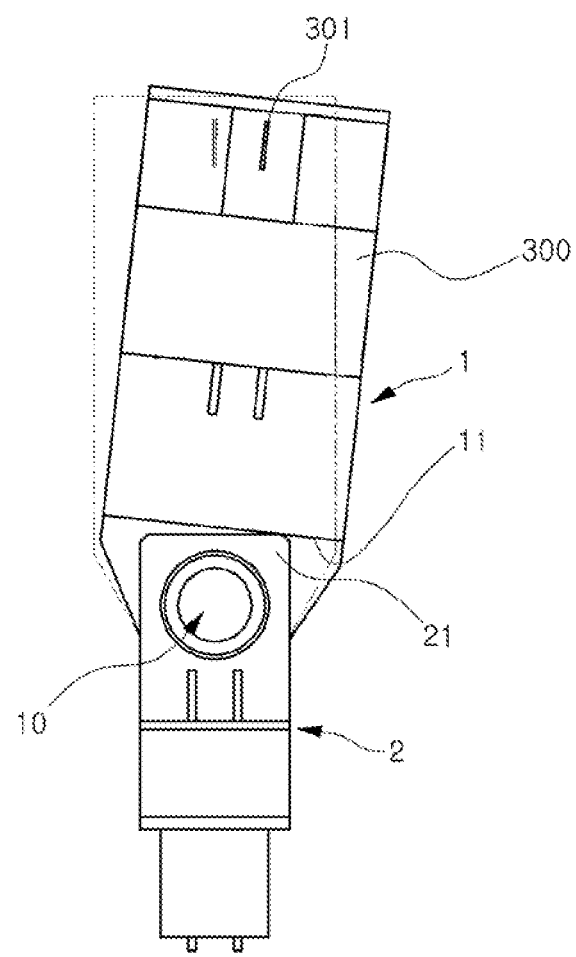
FIG. 6 is a bottom view illustrating a state of use of the embodiment of FIG. 2.

Referring to FIGS. 4 to 6, in the state of assembly where the first part 1 and the second part 2 are aligned on a straight line—e.g., the state where the angle of rotation of the first part with respect to the second part is 0 degrees—a gap G is formed between the vertical wall surface 11 of the first part 1 and the front tip of the front tip block 21 of the second part 2.

In FIG. 6, as the first part 1 rotates clockwise, a right-hand edge of the front end block 21 comes in contact with the vertical wall surface 11 of the first part 1, thereby restricting the rotation of the first part 1.

The front tip block 21 of the second part 2 has left-hand and right-hand edges chamfered. Chamfering the edges in different sizes or changing the interval of the gap G between the vertical wall surface 11 and the front tip block 21 enables designing different ranges for the maximum angle at which the first part 1 may rotate about the second part 2.

Figure 7:
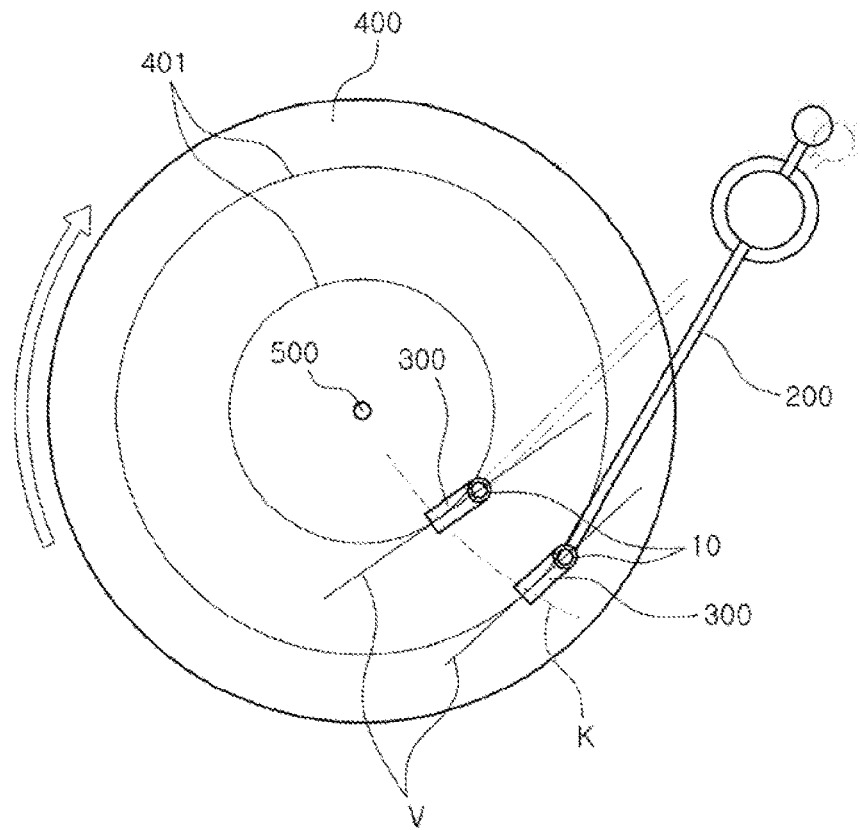
FIG. 7 is a view briefly illustrating a state of use of an audio turntable to which the embodiment of FIG. 2 applies.

FIG. 7 concerns the movement of the cartridge 300 placed on a record 400.

Using the tonearm 200 swinging, the trajectory K of the stylus of the cartridge 300 to read the groove 401 of the record 400 forms an arch, and such trajectory K may be the same as the trajectory of the stylus according to the prior art shown in FIG. 1.

According to an embodiment of the present invention, the headshell includes the joint part 10, which enables the stylus of the cartridge 300 to follow the direction of tangent to the groove, which nearly forms a circle, by the force of the stylus being pulled by the groove 401.

Further, where the cartridge 300 moves close to the spindle 500 as per playing music so that the stylus runs on the groove 401 which is a smaller circle, the first part may be turned by the force of being pulled by the groove 401, allowing the stylus of the cartridge 300 to be positioned close to the direction of the tangent V of the groove 401.

As such, while the record plays, the stylus may naturally be placed in the direction of the tangent V to the whole groove 401, thereby able to precisely read sound without being pushed to either the left or right of the groove. This delivers a constant sound quality on the inner groove or outer groove of the record, i.e., regardless of the position of the groove, leading to an overall sharply enhanced sound quality.

Further, the stylus may always pass midway of the groove, greatly reducing its one-sided wear and resultant wear or damage to the record groove and noise.

Specifically, the record groove which is formed of plastic tends to be subject to out-of-roundness worsening due to a fabrication tolerance or deformation. In conventional turntables, thus, the cartridge stylus cannot pass between both walls of the groove under even forces. By contrast, in the headshell as per an embodiment of the present invention, the first part may adequately be rotated through the joint part along the direction of the force of the stylus is stuck and pulled to the groove, delivering superior sound quality even from records deformed.

Meanwhile, limiting the angular range in which the first part 1 may turn about the second part 2 may relieving the user of the inconvenience of placing the stylus in exact position on the groove of the record 400 that would be caused by otherwise excessive turning of the first part 1. Further, the present invention allows the stylus which is to be placed on the groove to comply with the direction of proceeding along the groove to some degree, preventing inconvenience upon initial loading and damage to the stylus or groove that would occur as the stylus is loaded off the groove.

Figure 8:
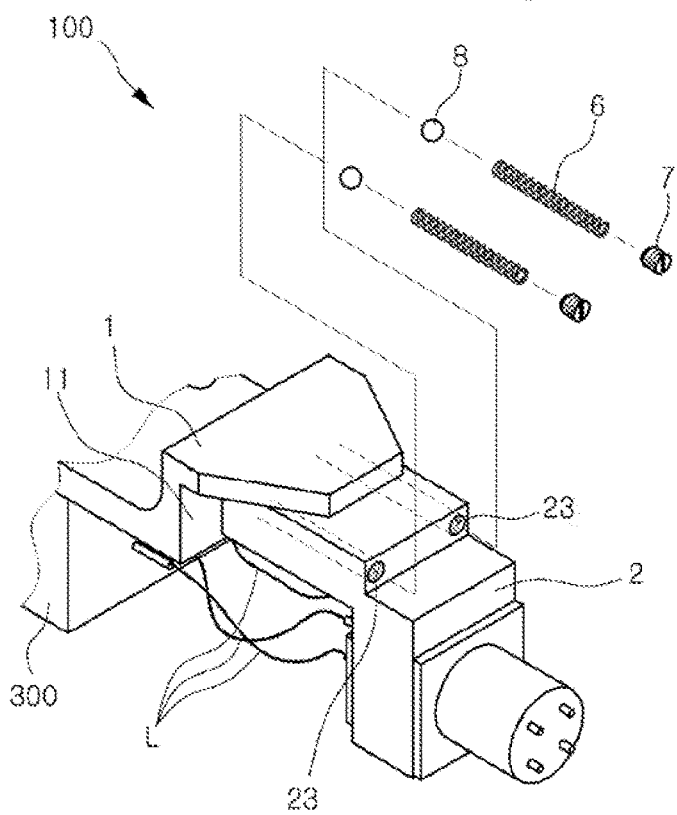
FIG. 8 is an exploded perspective view illustrating a headshell partially disassembled according to another embodiment of the present invention.

FIGS. 8 and 9 are directed to a cartridge-mountable headshell of an audio turntable according to another embodiment of the present invention.

According to another embodiment of the present invention, a headshell 100 includes a first part 1 and a second part 2 that are connected together via a joint part 10. The technical features of the first part 1, the second part 2, and the joint part 10 may encompass those of the embodiment shown in FIGS. 1 to 7 without conflicting with what has been described below.

In the embodiment shown in FIGS. 8 and 9, the headshell 100 includes springs 6 at left and right sides of the joint part 10 and tension adjusters 7 able to set different degrees of tension to the springs 6.

Referring to FIG. 8, the second part 2 has a pair of through holes 23 which are left-right symmetrical with respect to the joint part 10. The first open ends of the through holes 23 face the vertical wall surface 11 of the first part 1. The inner surfaces of the through holes 23 may be treaded.

The springs 6 are fitted into their respective through holes 23. The springs 6 pass and are exposed through the first ends of the through holes 23, contacting the first part 1. The front ends of the springs 6 are directed to the vertical wall surface 11, with balls 8 provided between the vertical wall surface 11 and the front ends of the springs 6.

Referring to FIG. 9, trenches 111 are formed in the vertical wall surface 11 to partially receive the balls 8. The bottoms of the trenches 111 are flat and come in point contact with the balls 8. When the first part 1 rotates about the second part, the positions where the balls 8 contact the trenches 111 may be varied depending on the angle at which the springs are twisted.

As such, the point contact made between the balls 8 and the first part 1 may reduce external vibration delivered to the first part 1.

Although not shown, according to another embodiment, the balls and the trenches in the vertical wall surface may be omitted, or the balls may be replaced with convex protrusions on the vertical wall surface. Alternatively, convex surfaces may be formed on the bottoms of the trenches, and cylindrical bodies to make point contact with the convex surfaces may be coupled to the front ends of the springs.

Each tension adjuster 7 is provided per spring 6, adjusting the length of the spring 6 to vary tension. In the embodiment shown, the tension adjusters 7 may be headless bolts that may be screwed into the through holes 23 and be adjustable for depth of insertion. The headless bolts may be rotated by a tool such as a screwdriver and are moved back and forth in the through holes 23 along the direction of rotation. The headless bolts may support the ends of the springs 6, and as the headless bolts move forwards or rewards, the springs 6 may be compressed or released, changing their tension.

Although not shown, the tension adjusters (or fastening screws) 7 may be replaced with various spring supporting means capable of changing position to adjust the length of the springs.

The first part 1 which is elastically supported by both springs 6 is placed substantially in straight line with the second part 2 in its normal position where no external force is exerted thereto. As such, since the tonearm, the headshell 100, and the cartridge 300 are substantially aligned along a straight line, the first part 1 and the cartridge 300 may remain in the straight position along the lengthwise direction of the tonearm when one lifts up the tonearm to put the cartridge on the record or when putting the tonearm back to its original position after the playback of music ends. Thus, user convenience is enhanced.

The springs 6 may elastically support the first part 1, absorbing and mitigating vibration that may cause sound distortions.

The tension of each of the springs 6 provided at both sides of the joint part 10 affects the rotation of the first part 1 about the second part 2.

The left-hand and right-hand springs 6 elastically support the first part 1, suppressing the vibration of the cartridge and hence having an influence on reading the groove, resultantly a change in sound quality. Specifically, sound being played tends to be tightened when the springs are in high tension and richer in less tension. Accordingly, the user may change the tension of the springs 6 via the tension adjusters 7 to figure out sound quality to her preference.

The tension adjusters 7 each provided at a respective one of the left-hand and right-hand springs 6 allow the user to adjust the tension of the left-hand and right-hand springs to different degrees.

The tension of headshell leads L connecting the cartridge 300 of the first part 1 with the second part 2 may disturb aligning the first part 1 with the second part 2. The tension adjusters 7 may be used for the purposes of aligning the first part 1 with the second part 2 as possible while canceling off the influence of the headshell leads L.

Further, the tension adjusters 7 allows the user to put the cartridge 300 in alignment with the tonearm. This feature delivers convenience to novices who are unskillful at cartridge alignment.

With the turntable in operation, the first part 1 may be misaligned with the second part 2 for various reasons. Such misalignment between the first part 1 and the second part 2 may cause the stylus to be more pushed to one of both the walls of the groove than to the other while tracking the groove, with the result of poor sound quality and uneven wear to the stylus. According to an embodiment of the present invention, the springs 6 elastically support the first part 1 and the second part 2 evenly at both sides, allowing them to remain aligned as possible. Thus, the stylus may proceed along the groove while contacting both the side walls of the groove without imbalance. Further, the springs 6 may absorb vibrations of the stylus in operation and external vibrations delivered from the tonearm to the cartridge, thereby enhancing sound quality. Meanwhile, FIG. 10 relates to a tonearm according to an embodiment of the present invention.

According to an embodiment of the present invention, a tonearm 200 is provided in an audio turntable and is of a swing type. A cartridge 300 is mounted on a front tip of the tonearm 200, and as shown, the cartridge 300 may be fastened through a headshell 100 affixed to the front tip of the tonearm. Here, the headshell 100 is a conventional one with no rotating feature. In this case, the headshell 100, the cartridge 300, and the front tip of the tonearm 200 where the headshell is joined may be considered as being integrally formed.

The tonearm 200 has a joint part 10 that allows the cartridge 300 to turn over a horizontal plane. In the embodiment shown, the joint part 10 divides the tonearm 200 into two parts and joints the two parts. Although not shown, the joint part may be replaced with other various connections, e.g., a pivot connection, like the headshell in the above-described embodiment.

In the tonearm 200 having the joint part 10, its front tip with the cartridge 300 is rotatable, allowing the stylus 301 pulled to the groove 401 of the record 400 to be aligned in the direction of tangent to the groove 401. Accordingly, as set forth above, the stylus may accurately read out information from the groove without being pushed to any side of the groove.

According to an embodiment, a headshell 100 connecting a cartridge 300 and a tonearm 200 of an audio turntable (not shown) includes a first part 1 connected with the cartridge 300, a second part 2 connected with the tonearm 200, and a joint axially and pivotally coupling the first part 1 and the second part 2. The second part 2 includes a first tension adjusting assembly and a second tension adjusting assembly. The first tension adjusting assembly may include a first ball 8, a first spring 6, and a first tension adjuster 7, and the second tension adjusting assembly may include a second ball 8, a second spring 6, and a second tension adjuster 7. The first tension adjusting assembly and the second tension adjusting assembly are formed in the second part 2 and in parallel with each other and at the same level from the ground.

The first tensioning assembly and the second tensioning assembly may be arranged symmetrically with respect to a longitudinal, virtual central axis of the headshell 100 as viewed from above the headshell 100.

The first part 1 of the headshell 100 may include a first hole 111 and a second hole 111 formed in a surface 11 facing the second part 2, and the first ball 8 and the second ball 8 may be inserted into the first hole 111 and the second hole 111, respectively, of the first part 1.

The first ball 8, the first spring 6, and the first tension adjuster 7 may be assembled in the order thereof, and the second ball 8, the second spring 6, and the second tension adjuster 7 may be assembled in the order thereof. For example, each ball 8 may be seated on, and supported by, an end of its corresponding spring 6, and its corresponding tension adjuster 7 may be fitted into the opposite end of the spring 6.

The first tension adjuster 7 or the second tension adjuster 7 may be at least one of a fastening screw or a headless bolt.

The joint may include a cylindrical joint shaft 12, a first bearing 3, a second bearing 3, a spring washer 4, and a bolt 5. The bolt 5 may be screwed through the spring washer 4, the second bearing 3, and the first bearing 3 into the cylindrical joint shaft 12. For example, the cylindrical joint shaft 12 may have a thread for coupling with the thread of the bolt 5.

The first part 1 of the headshell 100 may include a front tip and a rear tip stepped from the first tip. The front tip of the first part 1 may connect with the cartridge 300, and the rear tip of the first part 1 may pivotally connect with the second part 2, specifically, the front tip block 21 of the second part, via the joint 12, 3, 4, and 5. The second part 2 of the headshell 100 may include a front tip block 21 and a rear tip block 22 integrally formed with each other. The front tip block 21 and the rear tip block 22 may be coupled together substantially in the L shape. The rear tip block 22 may include a first through-hole 23 and a second through-hole 23 spaced apart from each other at a predetermined interval. The first tension adjusting assembly and the second tension adjusting assembly may be inserted into the first through-hole 23 and the second through-hole 23, respectively.

The first part 1 of the headshell 100 may swing or pivot on the second part 2 of the headshell 100 to be misaligned with the second part 2 and be aligned back with the second part 2 by elasticity of the first spring 6 and the second spring 6.

Although an example of allowing the first part of the headshell to be aligned with the second part of the headshell by interaction of the first tension adjusting assembly and the second tension adjusting assembly, specifically by the elasticity of the first spring and the second spring, embodiments of the present invention are not limited thereto. For example, maintaining the alignment between the first part and second part of the headshell may also be achieved by the repulsion of magnets as replacements for the springs.

Although in the above-described embodiment the first tension adjusting assembly and the second tension adjusting assembly each include the first ball 8 and the second ball 8, embodiments of the present invention are not limited, but the first tension adjusting assembly and the second tension adjusting assembly may be implemented with a spring 6 and a tension adjuster 7 without a ball 8. Further, the first ball 8 and the second ball 8 each may also be replaced with a member with a different shape, e.g., a solid rectangular block or cubic.

The above-described joint part-equipped headshell or tonearm may be mounted on an audio turntable, whether conventional or not, in such a manner as to remove and replace corresponding parts.

Further, the headshell with the joint part is also applicable to liner tracking arm turntables, but not only to swing types. According to an embodiment of the present invention, where the headshell is mounted on a tracking arm, although the groove is misaligned in center with the record, the cartridge may properly rotate along the trajectory of the groove, allowing for reading evenly from both sides of the groove.

According to embodiments of the present invention, use of the headshell and tonearm may relieve novices of difficulty in setting the audio turntable while delivering satisfactory record playing capability to experts.

What is claimed is:

1. A headshell for mounting a cartridge of an audio turntable, the headshell connecting the cartridge with a tonearm, wherein the headshell includes a joint part enabling the cartridge coupled to rotate on a horizontal plate, wherein the joint part includes a first part and a second part coupled together, the first part coupled with the cartridge and the second part connected with the tonearm, and wherein the second part includes springs provided at a left side and a right side of the joint part and elastically pushing the first part against the second part and tension adjustors each adjusting tension of a respective one of the springs.

2. A headshell connecting a cartridge and a tonearm of an audio turntable, the headshell comprising:
a first part connected with the cartridge;
a second part connected with the tonearm; and
a joint axially and pivotally coupling the first part and the second part, wherein the second part includes a first tension adjusting assembly and a second tension adjusting assembly, and wherein the first tension adjusting assembly and the second tension adjusting assembly are formed in the second part and in parallel with each other.

3. The headshell of claim 2, wherein the first tension adjusting assembly includes a first ball, a first spring, and a first tension adjuster, and the second tension adjusting assembly includes a second ball, a second spring, and a second tension adjuster.

4. The headshell of claim 3, wherein the first tension adjusting assembly and the second tension adjusting assembly are arranged symmetrically with respect to a longitudinal central axis as viewed from above the headshell.

5. The headshell of claim 3, wherein the first part of the headshell includes a first hole and a second hole in a surface facing the second part, and the first ball and the second ball are inserted into the first hole and the second hole, respectively, of the first part.

6. The headshell of claim 3, wherein the first ball, the first spring, and the first tension adjuster are assembled in the order thereof, and the second ball, the second spring, and the second tension adjuster are assembled in the order thereof.

7. The headshell of claim 3, wherein the first tension adjuster or the second tension adjuster is at least one of a fastening screw or a headless bolt.

8. The headshell of claim 3, wherein the joint includes a cylindrical joint shaft, a first bearing, a second bearing, a spring washer, and a bolt, and wherein the bolt is screwed through the spring washer, the second bearing, and the first bearing into the cylindrical joint shaft.

9. The headshell of claim 3, wherein the first part of the headshell includes a front tip and a rear tip stepped from the first tip, wherein the second part of the headshell includes a front tip block and a rear tip block integrally formed with each other, the rear tip block including a first through-hole and a second through-hole, and wherein the first tension adjusting assembly and the second tension adjusting assembly are inserted into the first through-hole and the second through-hole, respectively.

10. The headshell of claim 3, wherein the first part of the headshell swings or pivots on the second part of the headshell to be misaligned with the second part and is aligned back with the second part by elasticity of the first spring and the second spring.

* * * * *